US 6,691,850 B2

(12) United States Patent
Aschoff et al.

(10) Patent No.: US 6,691,850 B2
(45) Date of Patent: Feb. 17, 2004

(54) DEVICE FOR OPERATING A CLUTCH

(75) Inventors: Joerg Aschoff, Buehl (DE); Dieter Fornoff, Weingarten (DE); Ingo Drewe, Buehl (DE); Christian Meyer, Karlsruhe (DE); Rolf Mack, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/204,166

(22) PCT Filed: Nov. 28, 2001

(86) PCT No.: PCT/DE01/04473

§ 371 (c)(1),
(2), (4) Date: Oct. 9, 2002

(87) PCT Pub. No.: WO02/50444

PCT Pub. Date: Jun. 27, 2002

(65) Prior Publication Data

US 2003/0089572 A1 May 15, 2003

(30) Foreign Application Priority Data

Dec. 20, 2000 (DE) .......................... 100 63 440

(51) Int. Cl.$^7$ ................................ F16D 27/00
(52) U.S. Cl. ...................... 192/84.6; 192/94
(58) Field of Search ............. 192/40, 84.6, 94

(56) References Cited

U.S. PATENT DOCUMENTS

| 1,635,068 A | * | 7/1927 | Bing ..................... 192/84.6 |
| 4,648,498 A | * | 3/1987 | Herbulot et al. ............ 192/94 |
| 4,865,173 A | | 9/1989 | Leigh-Monstevens |
| 5,353,902 A | * | 10/1994 | Flowtow et al. ........... 192/84.6 |
| 5,441,462 A | | 8/1995 | Chan |
| 5,931,273 A | | 8/1999 | Moser |

FOREIGN PATENT DOCUMENTS

| DE | 197 01 739 A1 | 7/1998 |
| FR | 2 796 435 A | 1/2001 |
| WO | 98/13614 A1 | 4/1998 |

* cited by examiner

Primary Examiner—Richard M. Lorence
(74) Attorney, Agent, or Firm—Michael J. Striker

(57) ABSTRACT

The invention is based on a device for actuating a clutch (10), in particular for motor-vehicle drives, having an electronically controllable clutch servo unit (16) that comprises an electric motor (18, 52) and a reduction actuator gear (20) having two gear elements arranged coaxially in relation to each other (28, 38, 62 and/or 68, 82 and/or 96, 98) that are interconnected with each other in terms of propulsion via a thread (84, 86, 88) and that are displaced axially in relation to each other when they rotate relative to one another, whereby one of the gear elements (38, 68, 96) is immobilized axially in a housing (22, 58) of the clutch servo unit, and the actuating motion of the other gear element (28, 62, 82, 98) is transferred to a throwout bearing (42) of a clutch disk. It is proposed that the gear element (28, 62, 82, 98) that is axially displaceable relative to the housing (22, 58) is interconnected via a longitudinal guide (26, 66) with a rotor (56) or a motor shaft (24) of the electric motor (18) in a fashion that is torsion-resistant but axially displaceable, and acts on the throwout bearing (42) via an actuator (40, 74).

16 Claims, 5 Drawing Sheets

DEVICE FOR OPERATING A CLUTCH

BACKGROUND OF THE INVENTION

The invention is based on a device for actuating a clutch according to the preamble of claim 1.

Devices for actuating a clutch that have an electronically controllable clutch servo unit are used for motor-vehicle drives having an internal combustion engine and a mechanical shifting mechanism capable of being shifted fully or semi-automatically. The clutch or clutches can be used to transition the vehicle to motion or to shift gears. Such a motor-vehicle drive is made known in U.S. Pat. No. 5,441,462 in which an electronic control unit controls a clutch servo unit depending on operating parameters and driving parameters.

Furthermore, a clutch servo unit for engaging and disengaging a vehicle clutch using an electric motor is made known in DE 197 01 739 A1, which said clutch servo unit actuates a rod via a reduction gear in the form of a worm-gear pair having a worm gear and a spur gear, which said rod is guided in axially displaceable fashion and acts on a master unit of a hydraulic transmission path to the clutch. In accordance with different applications, clutch servo units with different electric motors and reduction gears are to be developed, produced, and kept on hand. Moreover, long transmission paths feature numerous sources of error and result in inaccuracies in terms of the actuating motion.

A clutch servo unit is made known in WO 98/13614 A1 in which a motor shaft of an electric motor features a thread on which an actuator having an internal thread sits. The actuator is immobilized in the circumferential direction in the housing of the clutch servo unit, but it is guided in axially displaceable fashion, so that its axial position changes when the motor shaft rotates. The actuator acts on the throwout bearing of a clutch via a mechanical or hydraulic transmission path in the form of a lever mechanism or a hydrostatic system. The electric motor is assisted in the direction of actuation of the actuator by an accumulator spring that is mounted on the housing on the one hand and, on the other hand, acts on the actuator. The components of the actuating forces and forces of the accumulator spring acting in the axial direction are supported via the mounting of the motor shaft, so that the bearings must be strengthened and the bearing play and the tolerances of the bearing components influence the accuracy of actuation.

ADVANTAGES OF THE INVENTION

According to the invention, the gear element that is axially displaceable relative to the housing is interconnected with a rotor or a motor shaft of an electric motor via a longitudinal guide in a manner that is torsionally-resistant but axially displaceable and acts via an actuator on the throwout bearing. As a result, the actuating forces and, if applicable, the forces of an accumulator spring are supported directly by the housing via the gear element immobilized in the housing. The motor bearings are not loaded by these forces, since, except for negligible friction forces, no forces can be transferred in the axial direction via the longitudinal guide. Moreover, the tolerance chain between the throwout bearing of the clutch and the support is very small, so that tolerance errors in the actuating motion and the position of the clutch servo unit can be kept very small.

The electric motor of the clutch servo unit acts on the throwout bearing via a high-reduction actuator gear, so that no additional amplifiers or transmission paths such as a hydraulic path or a hydraulic pressure booster, for example, are required. The sources of error typically associated with these systems are avoided in the device according to the invention, namely, for example, gas accumulation and leaks in the hydraulic path, which, combined with an ageing of the hydraulic fluid, result in ageing-induced displacements of power.

The reduction actuator gear is advantageously formed by a spindle gear or a helical gear of a known design having a shallow-pitched thread, or a spiral band gear in which the turns of the thread are formed by a spiral band. Of the gear elements that are interconnected in terms of propulsion, one of them at a time is immobilized in the housing, while the other—driven by the electric motor—is supported in torsion-resistant but axially-moveable fashion on the motor shaft by a longitudinal guide.

In the case of a helical gear, a gear element has an internal thread that meshes with an external thread of another gear element. In the case of a spiral band gear, a gear element is formed by a spiral band, while the other gear element is a transfer element that meshes between two adjacent windings of the spiral band by means of radially-oriented ends located on the circumference. When the electric motor drives the gear element interconnected with it, it rotates relative to the gear element that is held in the housing in torsion-resistant fashion. The gear element supported in a manner that allows it to move axially on the motor shaft is thereby moved in the axial direction by the thread. This actuating motion is transferred via an actuator to a throwout bearing of the clutch. Such an actuator gear is very compact in design and, when reduction is high, can produce very strong actuating forces with a high degree of positional accuracy.

In order to reduce the friction and wear between the ends of the transfer element and the spiral band, the ends are advantageously outfitted with sliding blocks or rollers that are supported on the ends by means of plain bearings or rolling bearings. Moreover, to promote good guidance of the spiral band, the ends are arranged on the circumference in pairs, whereby one spindle of a pair of spindles is offset in relation to the other spindle in the axial direction and in the circumferential direction, so that the spindles of one pair of spindles are located in the direction of the upward pitch of the spiral band.

The clutch servo unit typically works against the force of one or more clutch springs. Since the actuator gear is self-inhibiting, actuating forces are supported by the housing via the gear elements, so that the electric motor need only supply the forces required to move the throwout bearing. In order to keep these forces as low as possible and to reduce them—to the greatest extent possible—to the level needed to overcome the frictional forces, an accumulator spring acts on the axially displaceable gear element. As a result of this, the forces of the clutch springs are offset. Since the accumulator spring is supported on the one hand by the housing and, on the other, by the axially-moveable, rotating gear element, it is advantageous to provide an axially-acting rolling bearing between the accumulator spring and the axially displaceable gear element. Accumulator springs are known in the technical field, of course, and, in fact, in different mechanical and hydropneumatic embodiments.

SUMMARY OF THE DRAWINGS

Further advantages result from the following description of the drawings. Exemplary embodiments of the invention are shown in the drawings. The drawing, the description, and the claims contain numerous features in combination. One

DESCRIPTION OF THE PREFERRED EMBODIMENTS

Figure 1:
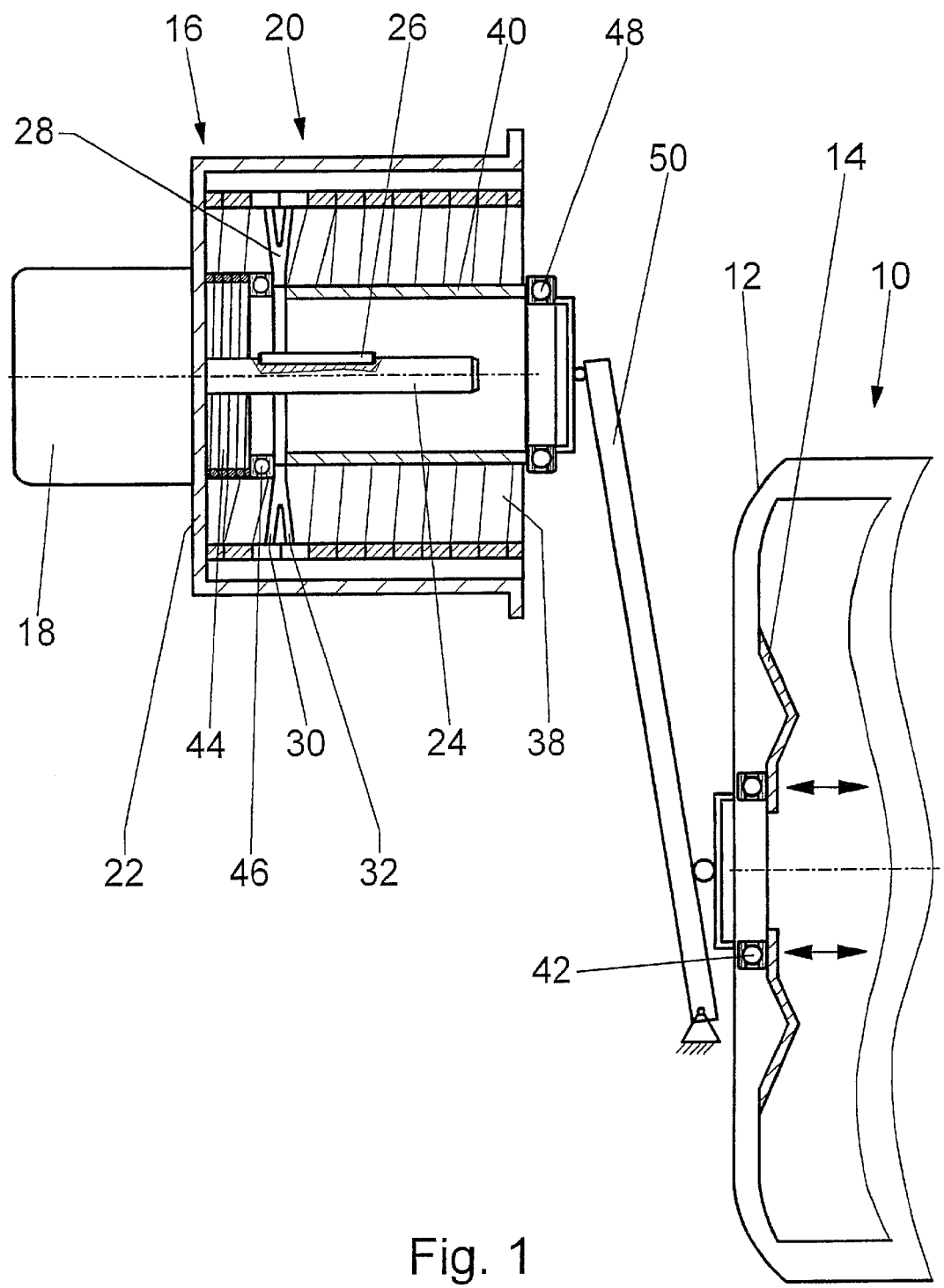
FIG. 1 is a partial longitudinal section through a clutch servo unit.

A clutch 10 has a clutch housing 12 in which a clutch disk—not shown in further detail—is arranged in axially-moveable fashion and which is acted upon in the usual fashion via a spring plate 14. A throwout bearing 42 is situated on the inside edge of the spring plate 14, which said throwout bearing is displaced axially by a clutch servo unit 16 via a lever 50.

Figure 2:
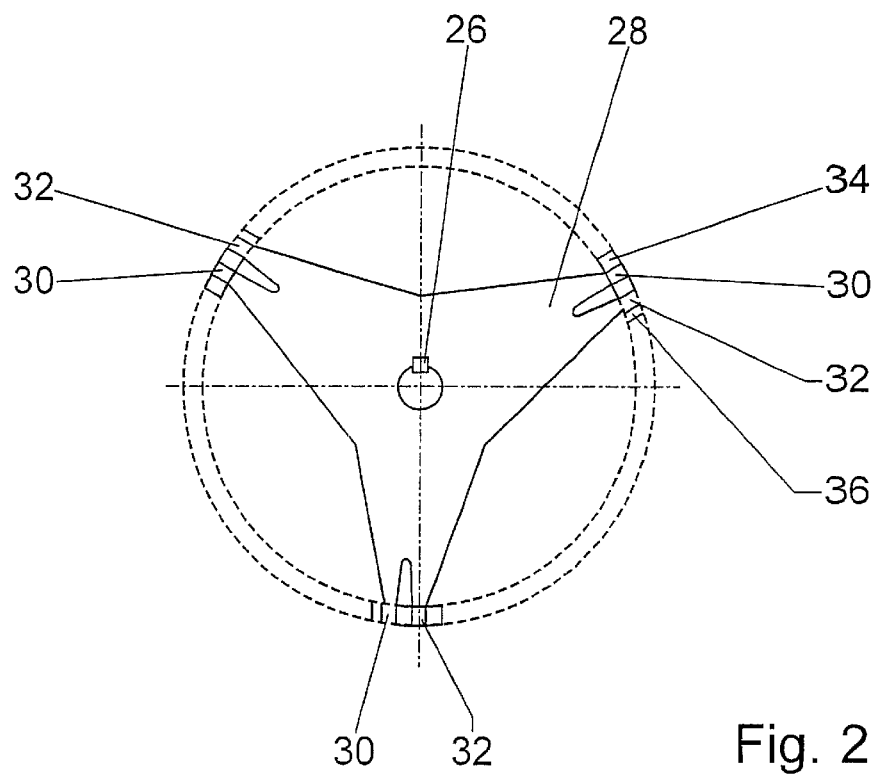
FIG. 2 is a view of a transfer element.
Figure 3:
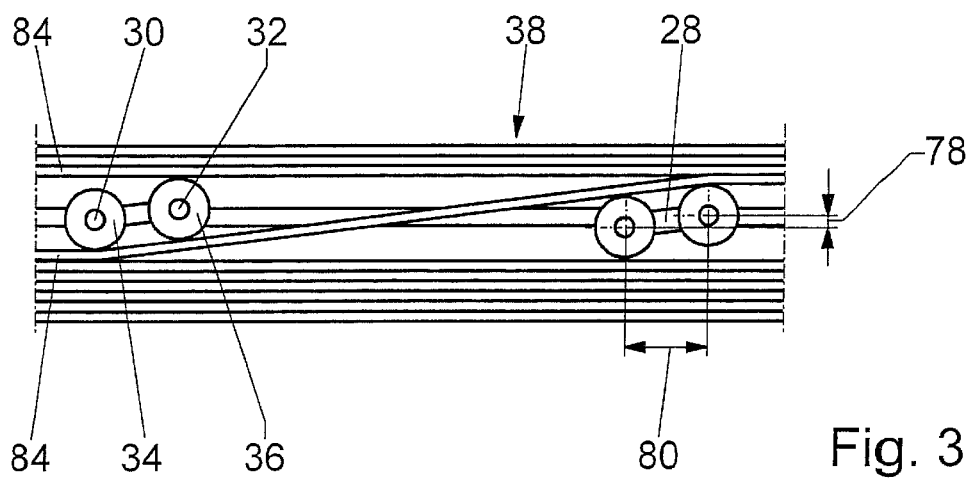
FIG. 3 is a partial winding of a spiral band with a transfer element.

The clutch servo unit 16 according to FIG. 1 has an electric motor 18 that is interconnected with an actuator gear 20 that is developed as a spiral band gear. Coaxially to the axis of rotation, a gear element 38 in the form of a spiral band is immobilized axially in its housing 22 and in the circumferential direction. A further gear element 28 in the form of a transfer element meshes between adjacent windings 84 (FIG. 3) in each case by means of its ends 30, 32, which are distributed in pairs around the circumference (FIG. 2). The ends 30, 32 of a pair have an axial displacement 78 and a displacement 80 in the circumferential direction. The relationship between the axial displacement 78 and the displacement 80 in the circumferential direction is selected so that the ends 30, 32 of a pair in the direction of the pitch of the winding 84 are located between two adjacent pairs. To reduce the friction between the ends 30, 32 and the spiral band 38, rollers 34, 36 are supported on the ends 30, 32 by plain bearings or rolling bearings. Sliding blocks can be provided in place of the rollers 34, 36. Neither the sliding blocks nor the rolling bearings are shown in any further detail.

The transfer element 28 sits on a motor shaft 24 of the electric motor 18 and is guided in an axially displaceable manner on a longitudinal guide 26 in the form of a parallel key. The longitudinal guide 26, which can also be developed as a driving tooth system, serves simultaneously to transfer the torque from the electric motor 18 to the transfer element 28.

When the transfer element 28 rotates around the axis of rotation, the ends 30, 32 on the circumference of the transfer element 28 follow the windings 84 of the spiral band 38, by way of which the transfer element 28 is displaced in the axial direction on the longitudinal guide 26. The transfer element 28 acts via a cylindrical actuator 40, a thrust bearing 48, and the lever 50 on the throwout bearing 42. The actuator 40 is held, free from play, between the transfer element 28 and the thrust bearing 48 by the spring plate 14. However, it can also be interconnected with the transfer element 28 on the frontal area that faces the transfer element 28.

To offset the force of the spring plate 14 of the clutch 10, the transfer element 28 is loaded by an accumulator spring 44 via a thrust bearing 46 on the frontal area opposite to the actuator 40, which said accumulator spring is supported at its other end by the housing 22. The equilibrant force as well as the actuating forces, and their reaction forces, are supported directly via the gear elements 28 and 38 of the self-inhibiting actuator gear 20 by the housing 22 and do not place a load the motor bearing.

Figure 4:
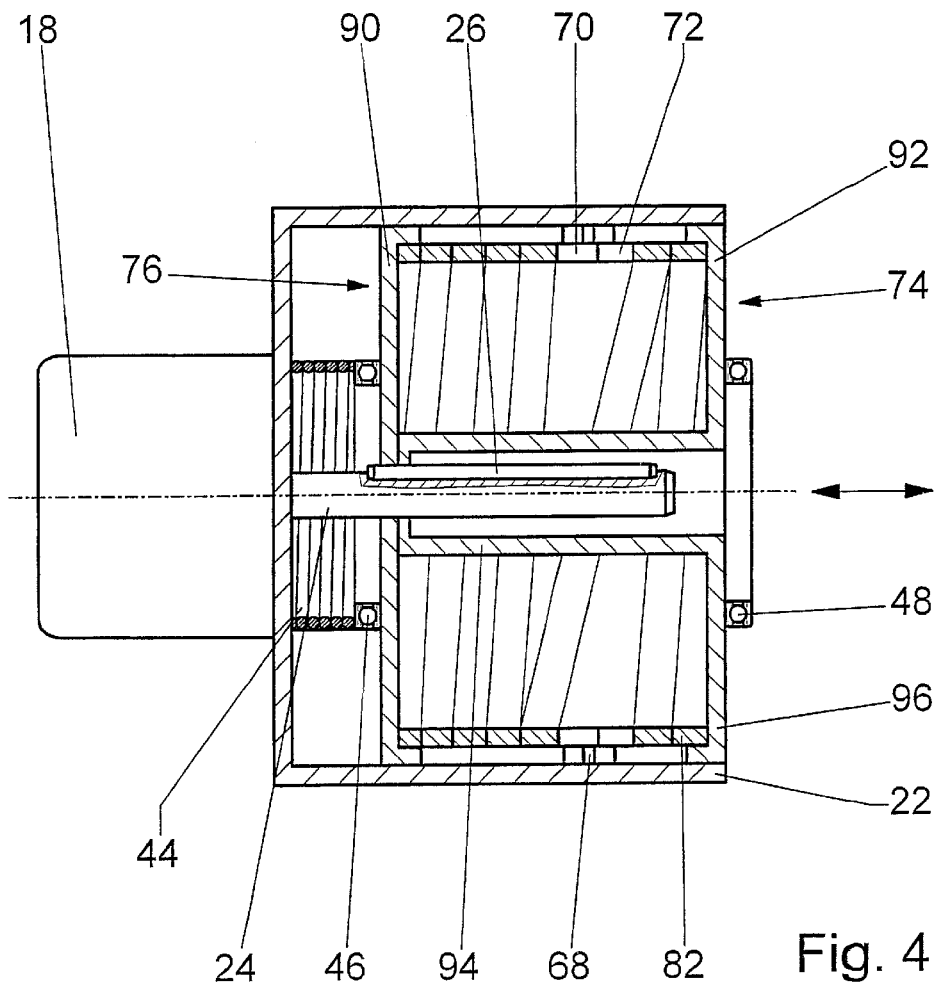
FIGS. 4–6 are variants of FIG. 1.

In the embodiment according to FIG. 4, a transfer element 68 is permanently interconnected with the housing 22 and meshes, by means of the rollers 70, 72, between the windings of the spiral band 82, while the spiral band 82 is held between an actuator 74 and a support element 76, whereby the actuator 74 and the support element 76 are situated on the longitudinal guide 26 in axially displaceable fashion. The actuator 74 has a wall part 92 that extends transversely to the axis of rotation, against which said wall part the thrust bearing 48 bears. The bearing surface between the wall part 92 and the thrust bearing 48 is usually designed in the shape of a ring. It is sufficient, however, when the actuator 74 bears against the thrust bearing 48 with at least three bearing surfaces distributed around the circumference.

A cylindrical wall part 94 abuts the inner edge of the wall part 92 of the actuator 74, which said cylindrical wall part extends inside the spiral band 82 and is supported by a wall part 90 of the support element 76 extending transversely to the axis of rotation, or it is interconnected with it. The actuator 74 and the support element 76 are advantageously centered on the outer circumference in the housing 22. If the actuator 74 and the support element 76 are driven by an electric motor 18, the spiral band 82 is displaced in the axial direction relative to the transfer element 68 immobilized in the housing, by way of which the actuator 74 and the support element 76 are moved in the same fashion and act on the thrust bearing 48. In this embodiment as well, the support element 76 is loaded by the accumulator spring 44 via the thrust bearing 46.

Figure 5:
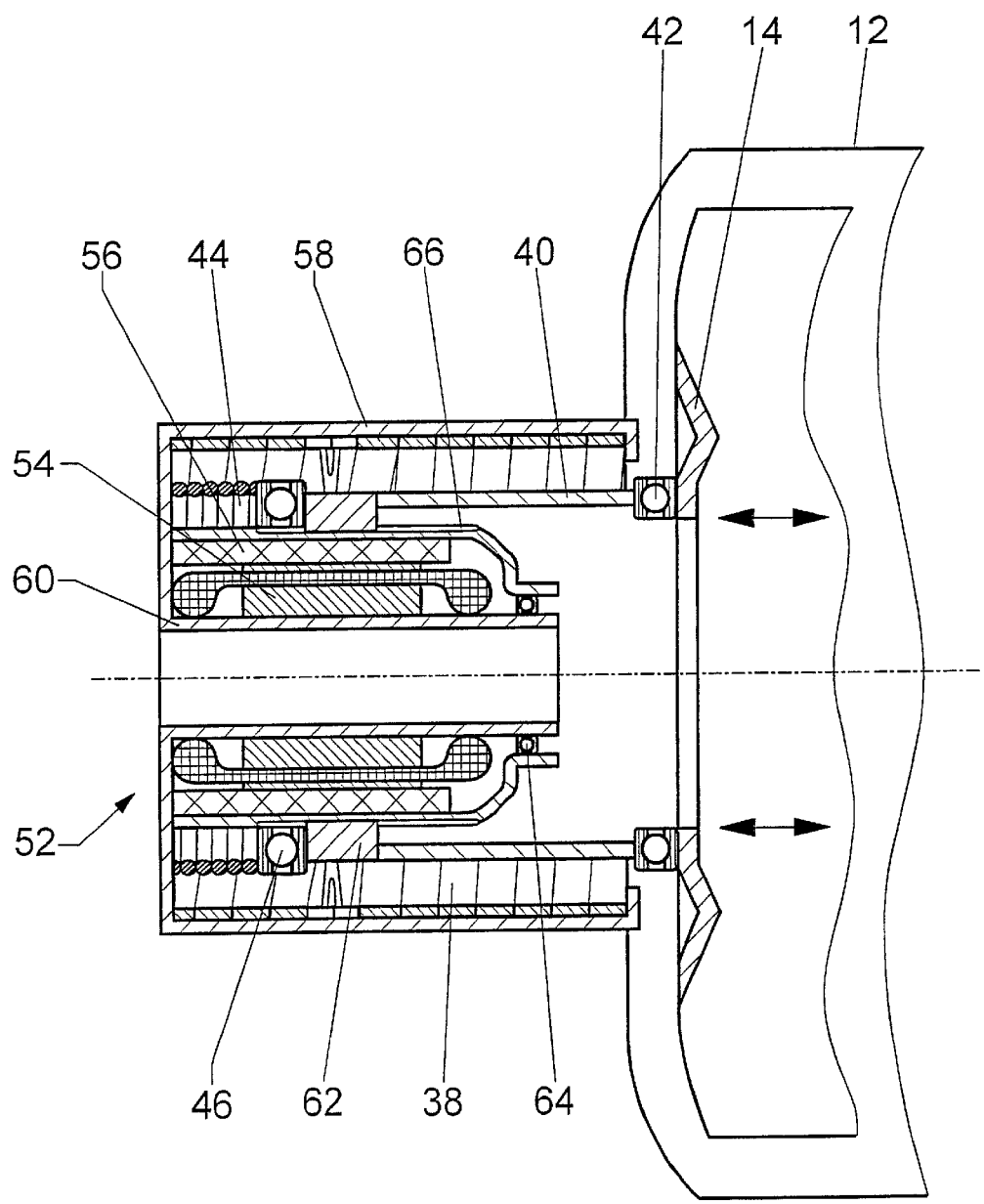

In the embodiment according to FIG. 5, the electric motor 52 is integrated in a housing 58 of the actuator 20. This results in a design of the clutch servo unit 16 that is very short and compact, which said clutch servo unit is advantageously arranged coaxially to the throwout bearing 42 and is flange-mounted to the clutch housing 12. A short force transmission results via the actuator 40, the gear elements 62, 38, the housing 58, and the clutch housing 12. The electric motor 52 cleverly makes use of the inside space of the spiral band 38. Its stator 54 is situated on a bearing sleeve 60 of the housing 58. It is surrounded by a rotor 56 that is supported on the bearing sleeve 60 in rotatable fashion by means of bearings 64.

The rotor 56 has a longitudinal guide 66 on the circumference in which a transfer element 62 meshes. The transfer element 62 has the same design on its circumference as the transfer element 28 according to FIG. 1, FIG. 2, and FIG. 3, so that, when the rotor 56 rotates around the axis of rotation 48, it moves in the axial direction and thereby displaces the throwout bearing 42 via the actuator 40. Finally, the accumulator spring 44 acts via the thrust bearing 46 on the transfer element 62, so that the force of the spring plate 14 is offset hereby as well.

Figure 6:
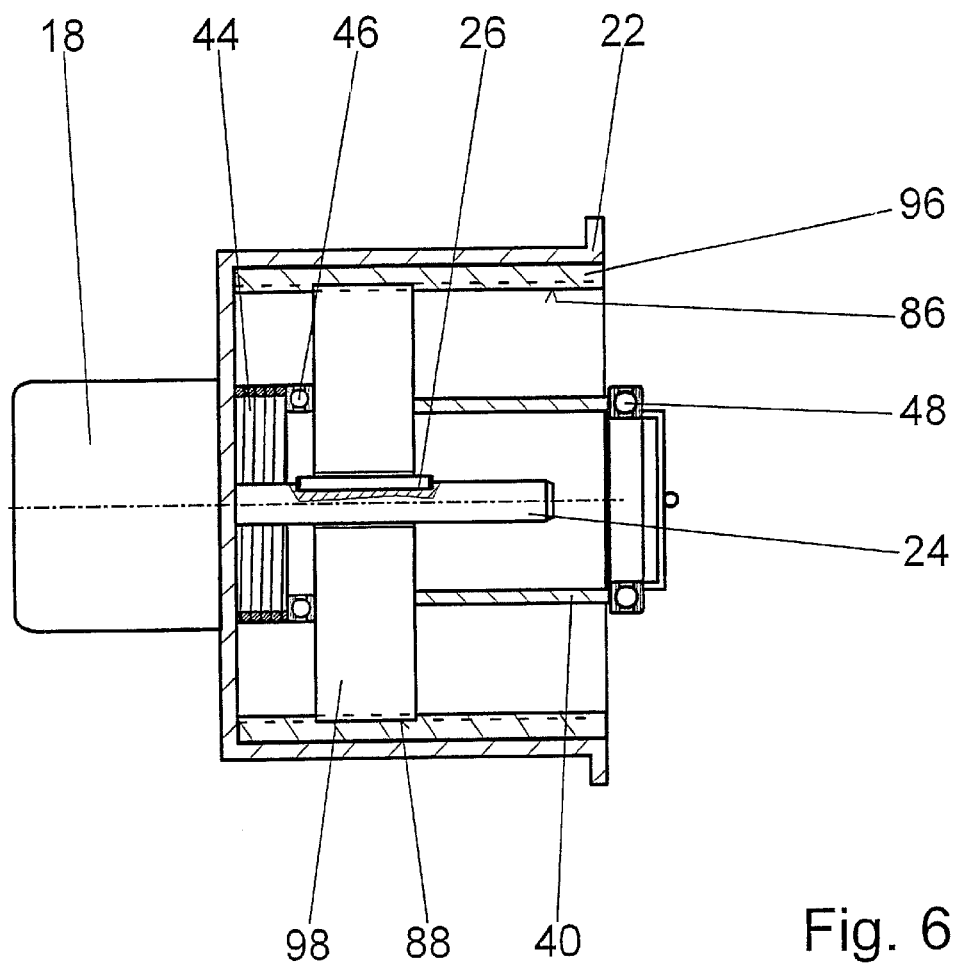

In the embodiment according to FIG. 6, the actuator gear 20 is a helical gear instead of a spiral band gear, in which said helical gear a gear element 96 in the form of a threaded sleeve having an internal thread 86 is permanently inserted in the housing 22. The gear element 96 can also be an integral component of the housing 22. A further gear element 98 meshes by means of its external thread 88 in the internal thread of the gear element 96. The gear element 98 is driven by the motor shaft 24 via the longitudinal guide 26, and it is guided in the axial direction on the motor shaft 24 in displaceable fashion. When the motor shaft 24 rotates, the gear element 98 is displaced axially in accordance with the pitch of the internal thread 86 and the external thread 88, and acts via the actuator on the thrust bearing 48. The internal thread 86 and the external thread 88 are advantageously developed as metric fine-pitch threads. In this embodiment as well, the accumulator spring 44 acts via the thrust bearing 46 on the gear element 98 that is axially displaceable in the housing 22.

What is claimed is:

1. A device for actuating a clutch (10), in particular for motor-vehicle drives, having an electronically controllable clutch servo unit (16) that comprises an electric motor (18, 52) and a reduction actuator gear (20) having two gear elements (28, 38, 62 and/or 68, 82 and/or 96, 98) arranged coaxially in relation to each other that are interconnected with each other in terms of propulsion via a thread (84, 86, 88) and that are displaced axially in relation to each other when they rotate relative to one another, whereby one of the gear elements (38, 68, 96) is immobilized axially in a housing (22, 58) of the clutch servo unit (16), and the actuating motion of the other gear element (28, 62, 82, 98) is transferred to a throwout bearing (42) of a clutch disk, wherein the gear element (28, 62, 82, 98) that is axially displaceable relative to the housing (22, 58) is interconnected via a longitudinal guide (26, 66) with a motor shaft (24) of the electric motor (18) in torsion-resistant but axially displaceable fashion, and acts on the throwout bearing (42) via an actuator (40, 74).

2. The device according to claim 1, wherein a gear element (96) is a sleeve that is permanently inserted in the housing (22) or is integrated with said housing, and said gear element has an internal thread (86) that meshes with an external thread (88) of the other gear element (98) that is guided in a longitudinal guide (26, 66) of the rotor or the motor shaft (24).

3. The device according to claim 2, wherein the internal thread (86) and the external thread (88) are designed as a metric fine-pitch thread.

4. The device according to claim 1, wherein the actuator gear (20) is a spiral band gear in which a gear element (28, 62, 68) is formed by a transfer element having radially-oriented ends (30, 32) distributed around the circumference that mesh between two adjacent windings (84) of a spiral band (38, 82) that forms a further gear element.

5. The device according to claim 4, wherein the ends (30, 32) have sliding blocks or rollers (34, 36) supported by plain bearings or rolling bearings.

6. The device according to claim 4, wherein the ends (30, 32) are located in pairs on the circumference, whereby one spindle (30) of a pair of spindles (30, 32) has an offset (78) in the axial direction from the other spindle (32), and it has an offset (80) in the circumferential direction, and the relationship between the offset (78) and the offset (80) corresponds to the pitch of the spiral band (38) between the pairs of spindles (30, 32).

7. The device according to claim 1, wherein the motor shaft (24) has a parallel key or a driving tooth system that serves simultaneously as rotary driver.

8. The device according to claim 4, wherein the transfer element (68) is immobilized in the housing (22), the spiral band (82) is situated axially between the actuator (74) and a support element (76) and, together with these, is guided axially along the longitudinal guide (26, 66) and is rotated by the motor shaft (24) and/or the rotor (56).

9. The device according to claim 8, wherein the support element (76) and the actuator (74) are supported on the external circumference in the housing (22) in a manner that is rotatable and axially displaceable.

10. The device according to claim 8, wherein the support element (76) and the actuator (74) have wall parts that extend transversely to an axis of rotation (48) of the motor shaft (24) that are connected by a cylindrical wall part within the spiral band (82).

11. The device according to claim 1, wherein at least one accumulator spring (44) acts on the gear element capable of being displaced relative to the housing.

12. The device according to claim 11, wherein an axially-acting rolling bearing (46) is located between the accumulator spring (44) and the gear element (28, 62, 82).

13. The device according to claim 1, wherein the electric motor (52) is integrated in the housing (58) of the actuator gear (20).

14. The device according to claim 13, wherein the spiral band (38) surrounds the electric motor (52).

15. The device according to claim 13, wherein the electric motor (52) has an inboard stator (54) and an outboard rotor (56) that has an axial guide (66) on the circumference for the driven gear element (68, 82).

16. The device according to claim 13, wherein the housing (22) of the clutch servo unit (16) is coaxially flange-mounted on the clutch housing (12), and the actuator (40) acts directly on the throwout bearing (42).

* * * * *